US010290459B2

(12) United States Patent
Raj et al.

(10) Patent No.: US 10,290,459 B2
(45) Date of Patent: *May 14, 2019

(54) MAGNETRON HAVING ENHANCED COOLING CHARACTERISTICS

(71) Applicant: Applied Materials, Inc., Santa Clara, CA (US)

(72) Inventors: Govinda Raj, Santa Clara, CA (US); Simon Yavelberg, Cupertino, CA (US); Ramprakash Sankarakrishnan, Santa Clara, CA (US)

(73) Assignee: Applied Materials, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/163,226

(22) Filed: Oct. 17, 2018

(65) Prior Publication Data

US 2019/0051485 A1 Feb. 14, 2019

Related U.S. Application Data

(63) Continuation of application No. 15/271,451, filed on Sep. 21, 2016, now Pat. No. 10,141,153.

(Continued)

(51) Int. Cl.
*H01J 23/00* (2006.01)
*B22F 5/10* (2006.01)
(Continued)

(52) U.S. Cl.
CPC .......... *H01J 23/005* (2013.01); *B22F 3/1055* (2013.01); *B22F 5/10* (2013.01);
(Continued)

(58) Field of Classification Search
CPC .......... B22F 3/1055; B22F 5/10; B33Y 80/00; H01J 23/005; H01J 25/50
See application file for complete search history.

(56) References Cited

U.S. PATENT DOCUMENTS 3,582,707 A 6/1971 Hynes
4,794,304 A * 12/1988 Ito .......................... H01J 23/005
313/17

(Continued)

FOREIGN PATENT DOCUMENTS

CN 206574669 U 10/2017

OTHER PUBLICATIONS

PCT Notification of Transmittal of the International Search Report and the Written Opinion of the International Searching Authority for Application No. PCT/US2016/049993; dated Dec. 1, 2016; 11 total pages.

(Continued)

*Primary Examiner* — Alexander H Taningco
*Assistant Examiner* — Kurtis R Bahr
(74) *Attorney, Agent, or Firm* — Patterson + Sheridan, LLP

(57) ABSTRACT

Magnetron configurations that provide more efficient and/or more uniform cooling characteristics and methods for forming the magnetrons are provided. The magnetron includes one or more flow directing structures disposed between parallel cooling fins. The flow directing structures direct air flow across various surfaces of the cooling fins that otherwise would be obstructed by magnetron components, reducing the incidence and/or magnitude of hot spots on the cooling fins and/or on other magnetron components. The flow directing structures also adjust flow rates to improve cooling efficiency.

20 Claims, 9 Drawing Sheets

Related U.S. Application Data

(60) Provisional application No. 62/222,161, filed on Sep. 22, 2015.

(51) Int. Cl.
   *B33Y 80/00* (2015.01)
   *B22F 3/105* (2006.01)
   *H01J 25/50* (2006.01)

(52) U.S. Cl.
   CPC .............. *B33Y 80/00* (2014.12); *H01J 25/50* (2013.01); *Y02P 10/295* (2015.11)

(56) References Cited

U.S. PATENT DOCUMENTS

| | | | | |
|---|---|---|---|---|
| 5,331,248 A | * | 7/1994 | Kang | H01J 23/005 313/13 |
| 5,351,166 A | * | 9/1994 | Kang | H05B 6/642 165/80.3 |
| 5,412,282 A | * | 5/1995 | Kang | H01J 23/005 313/45 |
| 9,230,726 B1 | * | 1/2016 | Parker | H01F 27/10 |
| 2003/0155104 A1 | * | 8/2003 | Wenger | F28D 15/0233 165/80.3 |
| 2006/0049766 A1 | * | 3/2006 | Lee | H01J 23/005 315/39.51 |
| 2006/0169019 A1 | * | 8/2006 | Kutscher | B21D 53/04 72/379.2 |
| 2012/0024514 A1 | | 2/2012 | Shen | |
| 2013/0015182 A1 | * | 1/2013 | Akutsu | H01J 23/005 219/761 |

OTHER PUBLICATIONS

Chinese Search Report, Application No. 2016108432267 dated Jun. 20, 2018.

* cited by examiner

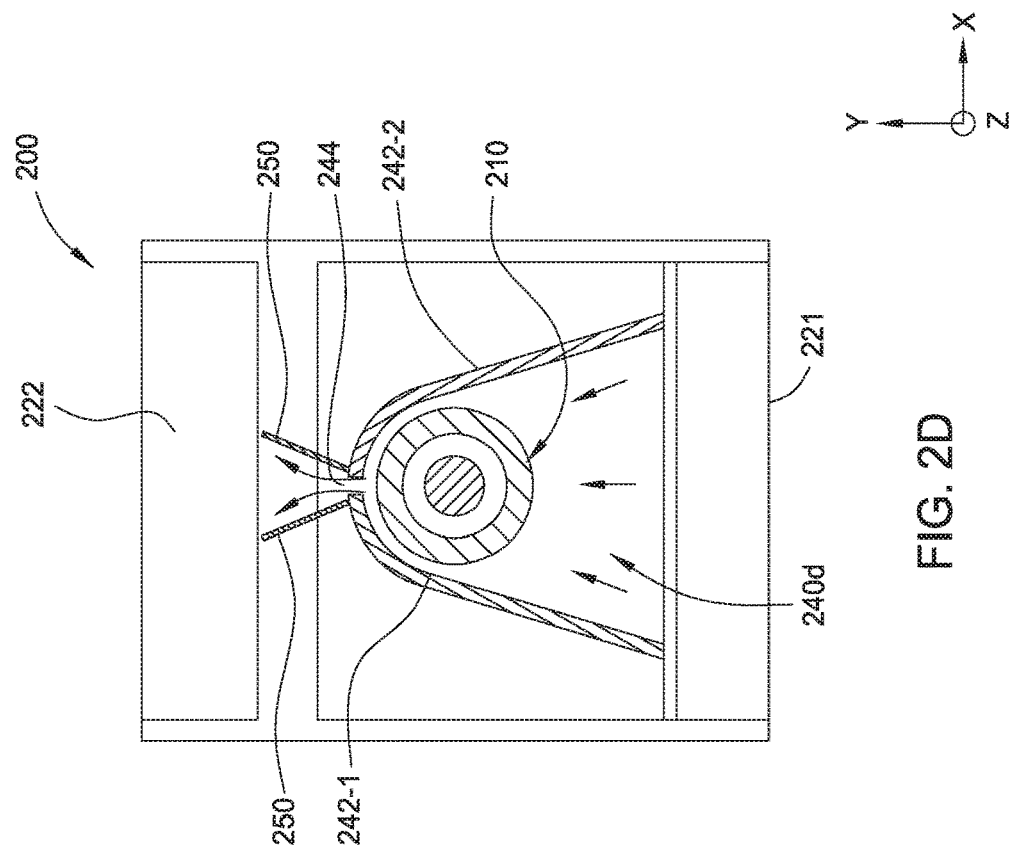
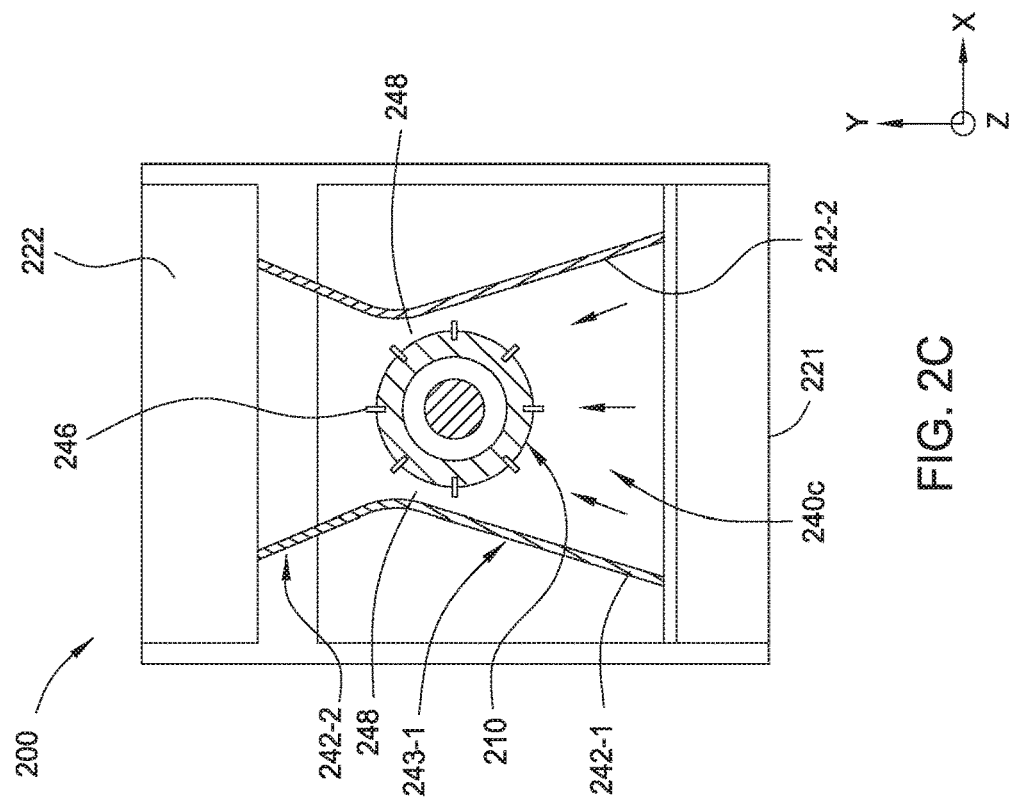

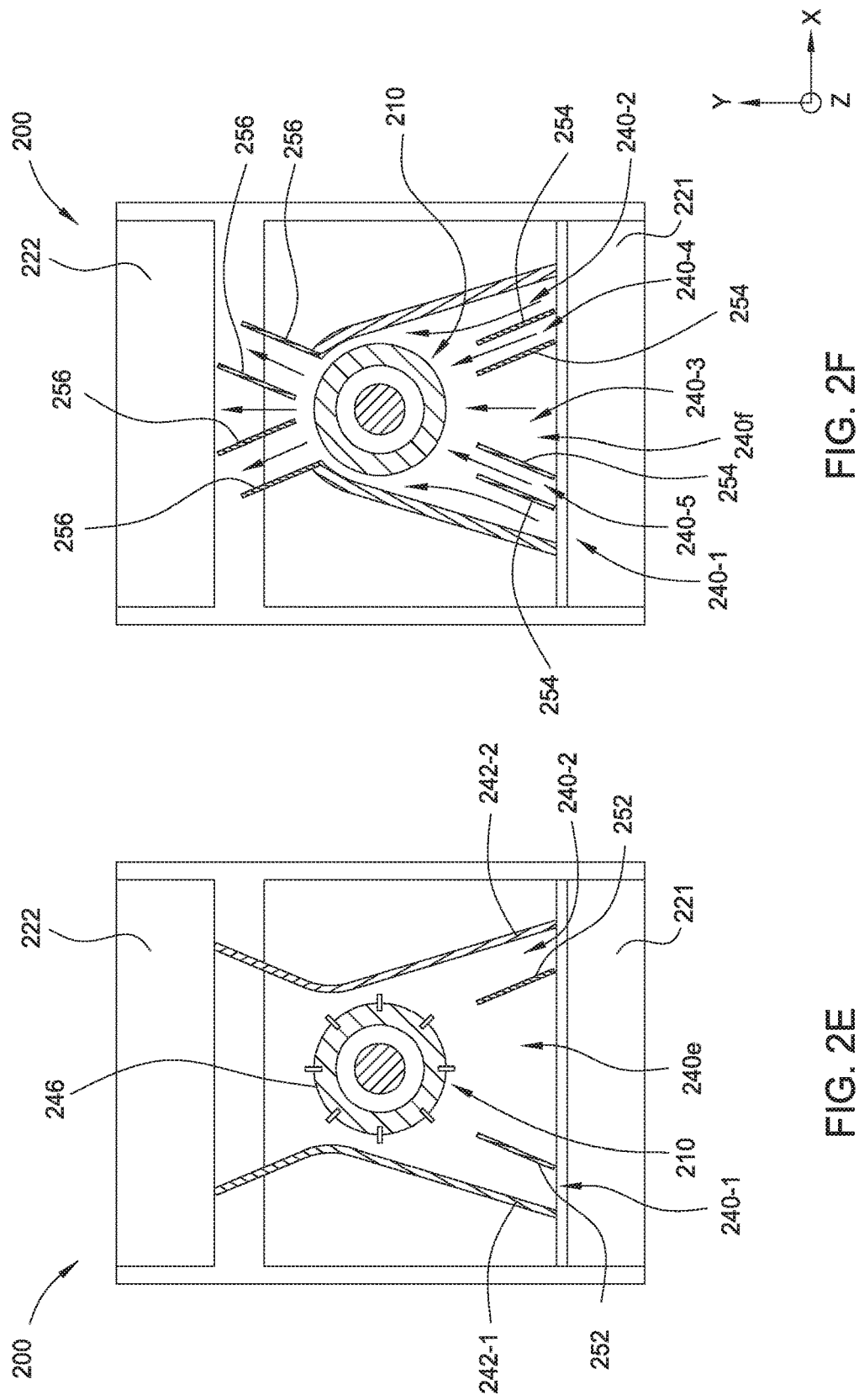

MAGNETRON HAVING ENHANCED COOLING CHARACTERISTICS

CROSS-REFERENCE TO RELATED APPLICATIONS

This application is a continuation application of U.S. application Ser. No. 15/271,451, filed on Sep. 21, 2016, which claims benefit of U.S. application Ser. No. 62/222,161, filed on Sep. 22, 2015, which are herein incorporated by reference.

BACKGROUND

Field

Embodiments disclosed herein generally relate to magnetrons, and more specifically to magnetrons having enhanced cooling fins and methods for making the magnetrons.

Description of the Related Art

Magnetrons are used in a variety of consumer and industrial applications (e.g., microwaves, RADAR, plasma generators, etc.) to generate radio frequency (RF) signals. In general, a magnetron generates RF signals by emitting a stream of electrons from a heated cathode and passing the stream of electrons over one or more cavities formed in an anode. As the stream of electrons is emitted towards the anode cavities, a strong magnetic field is applied to the electrons, causing the electrons to follow an arching path, creating oscillating currents along the edges of the anode cavities. These oscillating currents then cause RF signals to be emitted from the magnetron at frequencies that are based on the physical characteristics of the anode cavities.

To remove heat generated by the cathode during electron emission, magnetrons typically include one or more fins that are coupled to a core structure in which the cathode is disposed. Conventional cooling fins typically include a series of substantially planar sheets arranged in parallel. During operation, air is passed between the planar sheets to remove heat from the core structure. In general, air flows in a linear direction between the series of planar sheets. Consequently, portions of surfaces of the planar sheets are blocked by the core of the magnetron, causing hot spots on the sheets and resulting in non-uniform cooling characteristics.

Therefore, there is a need in the art for improved designs of cooling features for magnetron applications.

SUMMARY

Embodiments disclosed herein provide a magnetron formed by three dimensional printing. Alternatively, the magnetron may be manufactured by traditional manufacturing methods. In one embodiment, the magnetron includes a monolithic body having a core and a plurality of cooling fins extending from the core.

In another embodiment, the magnetron includes a core, two or more fins surrounding the core, and one or more flow directing structures formed between neighboring two or more fins. The one or more flow directing structures form flow channels between the two or more fins. In one embodiment, a first portion of the flow channel converges towards the core.

Another embodiment provides a method for forming a magnetron using a three dimensional printer. The method includes printing a monolithic body having a core and two or more fins extending from the core. In one embodiment, the two or more fins are connected by flow directing features.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIGS. 2C-2F are schematic sectional views of magnetrons having various configurations of flow directing structures formed between cooling fins.

Figure 1A:
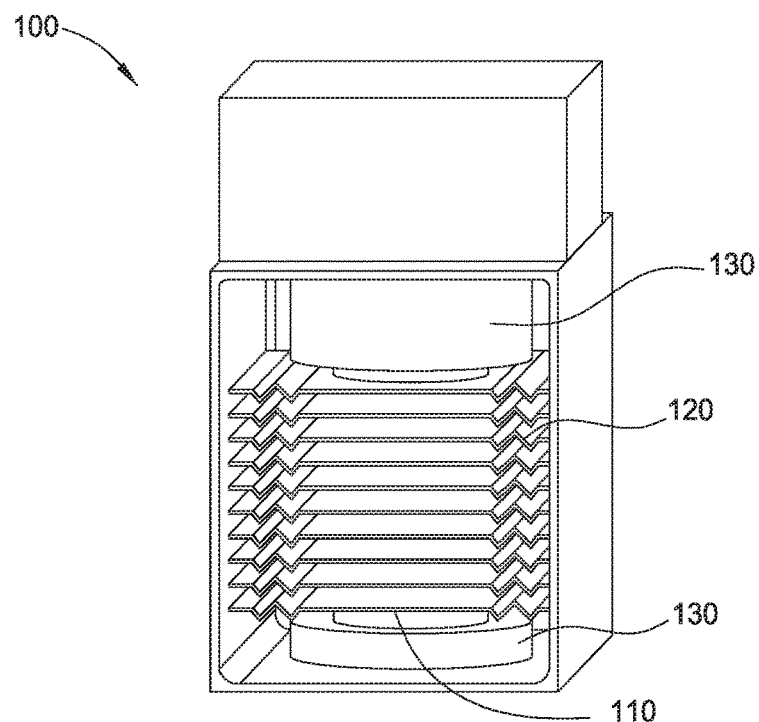
FIG. 1A is a schematic perspective view of a magnetron of prior art.

To facilitate understanding, identical reference numerals have been used, where possible, to designate identical elements that are common to the figures. It is contemplated that elements disclosed in one implementation may be beneficially utilized on other implementations without specific recitation.

DETAILED DESCRIPTION

The descriptions of the various embodiments are presented for illustrative purposes and are not intended to be exhaustive or limiting. Many modifications and variations will be apparent to those of ordinary skill in the art without departing from the scope and spirit of the described embodiments. The terminology used herein was chosen to best explain the principles of the embodiments, the practical applications or technical improvements over technologies found in the marketplace, or to enable others of ordinary skill in the art to understand the embodiments disclosed herein.

Embodiments of the present disclosure generally provide magnetron configurations that provide more efficient and/or more uniform cooling characteristics and methods for forming the magnetrons. In some embodiments, the magnetron includes cooling fins between which one or more flow directing structures are disposed. The flow directing structures direct air flow across various surfaces of the cooling that otherwise would be obstructed by magnetron components, reducing the incidence and/or magnitude of hot spots on the cooling fins and/or on other magnetron components. In some embodiments, the flow directing structures not only affect where the cooling fluid goes but how fast the cooling fluid flows. For example, the flow directing structures may form a flow channel that gradually narrows resulting in increased flow rate that the narrow portion of the flow channel. Increased flow rate results in increased cooling capacity, thus, improving cooling efficiencies at certain regions, for example, near the core of the magnetron.

In some embodiments, the thickness of the cooling fins may be reduced to increase the spacing between the cooling fins while still retaining sufficient thermal capacity to effectively conduct heat. Accordingly, the cooling characteristics of the cooling fins may be improved. In one embodiment, the presence of the flow directing structures may provide physical support to the cooling fins with reduced thickness.

According to embodiments of the present disclosure, at least a portion of the magnetron may be formed using a three dimensional printer. In one embodiment, a monolithic body, including a core, a plurality of cooling fins, and flow directing structures positioned between the cooling fins, may be formed using three dimensional printing. In another embodiment, a plurality of cooling fins and the flow directing structures between the cooling fins may be formed by three dimensional printing and attached to a core to form a magnetron. By using three dimension printing, embodiments of the present disclosure enable desired configurations of cooling fins and flow directing structures which would otherwise difficult if not impossible to form with traditional methods of manufacturing.

Figure 1B:
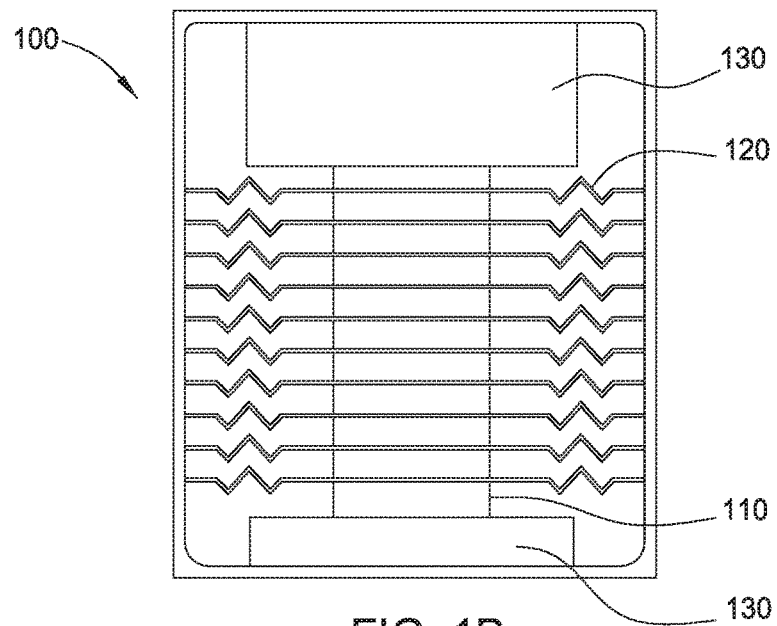
FIG. 1B is a schematic side view of the magnetron of FIG. 1A.

FIG. 1A is a schematic perspective view of a conventional magnetron 100. FIG. 1B is a schematic side view of the magnetron 100 of FIG. 1A. The magnetron 100 includes a core 110 and one or more magnets 130 disposed above and/or below the core 110. The core 110 generally includes a cylindrical cathode structure surrounded by a cylindrical anode structure. A plurality of cooling fins 120 are thermally coupled to an outer surface of the core 110 to provide cooling to the core 110. The cooling fins 120 are typically a series of thermal conductive sheets arranged in parallel. Each cooling fin 120 may be a rectangular sheet having a central hole for receiving the core 110.

During operation of the magnetron 100, the cathode of the core 110 may be heated to stimulate electron emission. Air is passed over from one side of the cooling fins 120 towards the core 110 to remove excess heat from the core 110. The air flow is obstructed by the core 110 causing portions of the surfaces receive insufficient exposure of the air flow, leading to hot spots on the cooling fins 120 and premature failure of components of the magnetron 100.

Embodiments of the present disclosure provide magnetrons having a core, a plurality of cooling fins connected to the core, and flow directing structures formed between cooling fins. In one embodiment, the flow directing structures direct air flow around the core to provide uniform cooling. In one embodiment, the flow directing structures form flow channels between the cooling fins. The flow channels may distribute air flow to a desired flow pattern to provide desired cooling effect. In one embodiment, the flow channel may distribute air flow more uniformly across over various components, reducing the magnitude of temperature gradients in the magnetron. In one embodiment, the flow channel may form a pattern to increase flow rate near the core.

In one embodiment, the cooling fins and the flow directing structures may form a monolithic body. The flow directing structures between the cooling fins provide structural support to the cooling fins and enable cooling fins with reduced thickness. In one embodiment, the cooling fins and at least a portion of the core may form a monolithic body providing improved thermal conduction between the core and the cooling fins. In one embodiment, the core, the cooling fins and the flow directing structures form a monolithic body. The magnetrons according to the present disclosure may be formed by three-dimensional printing (3D printing).

Figure 2A:
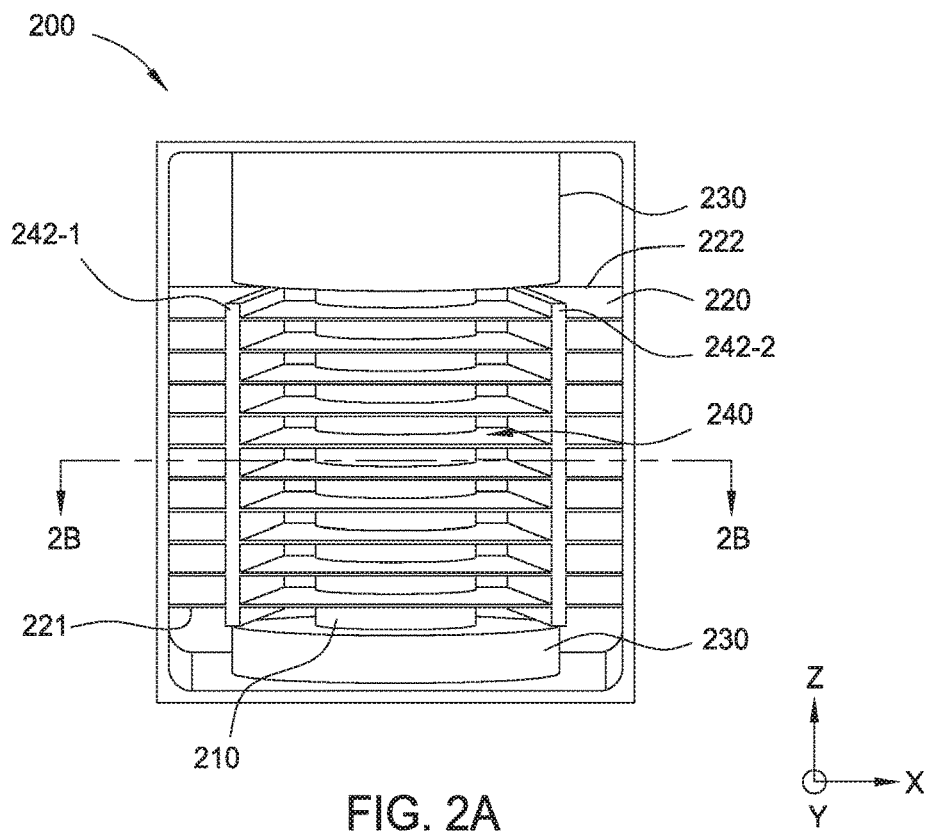
FIG. 2A is a schematic perspective view of a magnetron having flow directing structures formed between cooling fins.
Figure 2B:
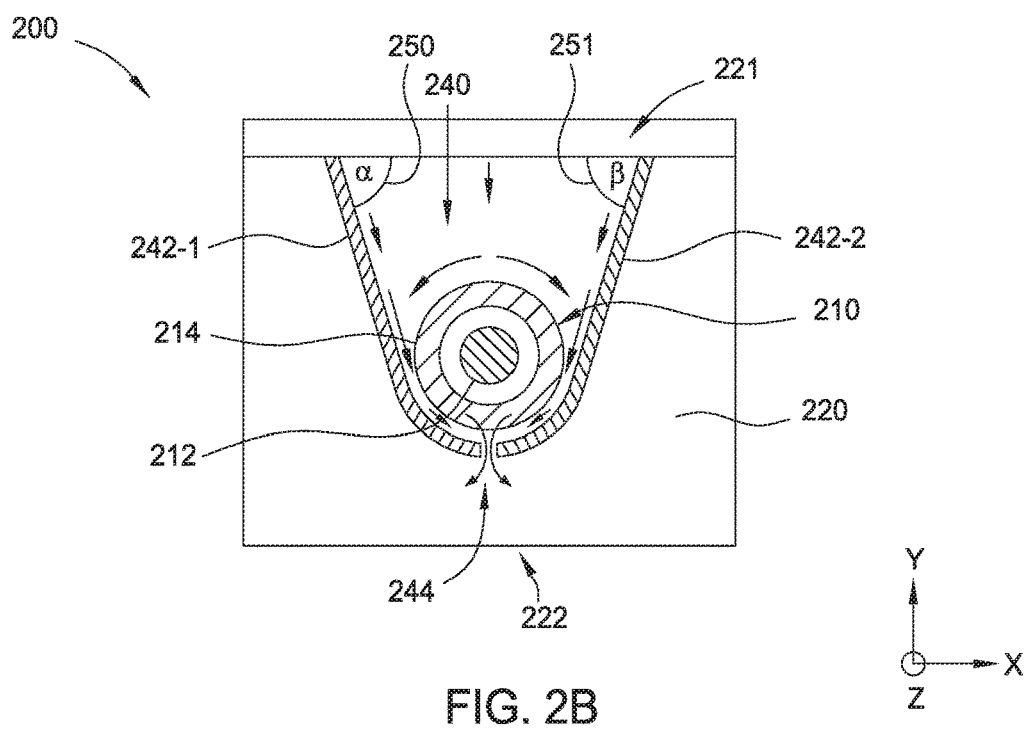
FIG. 2B is a schematic sectional view of the magnetron of FIG. 2A.

FIG. 2A is a schematic perspective of a magnetron 200 according to one embodiment of the present disclosure. FIG. 2B is a schematic sectional view of the magnetron 200 along the line 2B-2B on FIG. 2A. The magnetron 200 includes a core 210. In one embodiment, the core 210 includes a cathode 212 and an anode 214 surrounding the cathode 212. In one embodiment, the cathode 212 may be a cylindrical member that is disposed within and/or at least partially surrounded by the anode 214. The anode 214 may include a cylindrical member that surrounds all or part of the cathode 212. For example, the cathode 212 and anode 214 may include concentric electrodes. In some embodiments, the cathode 212 and/or anode 214 are maintained under vacuum conditions during operation of the magnetron 200. Maintaining vacuum conditions may serve several purposes, including reducing the incidence of arcing between the cathode 212 and anode 214, and reducing oxidation of the cathode 212 and/or anode 214. The cathode 212 may be composed of any suitable material, including metals such as tungsten and nickel into which thorium or barium has been diffused. The anode 214 also may be composed of any suitable material, including conductive materials such as copper. Magnets 230 may be positioned above and/or below the cathode 212 and anode 214. The magnets 230 may include permanent magnetics and/or electromagnets.

The magnetron 200 further includes a plurality of cooling fins 220 disposed surrounding the core 210 to provide cooling to the core 210. The plurality of cooling fins 220 may be a plurality of thin sheets arranged in parallel. In one embodiment, the plurality of cooling fins 220 may be evenly spaced. Alternatively, the spacing between the plurality of cooling fins 220 may be varied to achieve desired cooling effect.

The plurality of cooling fins 220 may include a plurality of substantially planar, thermally conductive sheets. In one embodiment, the cooling fins 220 have a square shape as shown in FIG. 2B. Alternatively, the cooling fins 220 may include other suitable shapes. The cooling fins 220 may have a length and width selected to promote heat transfer. In one embodiment, the cooling fins 220 may have a square shape with a length between about 5 centimeters to about 20 centimeters. In one embodiment, the cooling fins 220 may have a square shape having a length of about 10 centimeters. In one embodiment, each cooling fin 220 may have a thickness between about 0.1 millimeters to about 3 millimeters. In one embodiment, each cooling fin 220 may have a thickness between about 0.5 millimeters to about 1.0 millimeter. In general, however, the cooling fins 220 may have dimensions that are greater than or less than the dimensions described above. Additionally, although the cooling fins 220 are shown as being substantially parallel to each other, in other examples, one or more of the cooling fins 220 may be positioned at one or more other non-zero angles relative to the other cooling fins 220. The cooling fins 220 are generally composed of a thermally conductive material, such as copper (Cu) and/or aluminum (Al). For example, Al-1010 may be used to form the cooling fins 220.

Each cooling fin 220 may include a front edge 221 and a rear edge 222. The flow directing structure includes one or more channel walls 242-1, 242-2 (collectively "channel walls 242") and an air restriction 244.

According to embodiments of the present disclosure, the magnetron 200 further includes a flow channel 240 formed by one or more flow directing structures between the cooling fins 220 to direct air flow towards and/or away from certain structural features of the magnetron 200. In the embodiment shown in FIGS. 2A and 2B, the flow directing structures may include two channel walls 242-1, 242-2 (collectively 242).

Each channel wall 242 may start near the front edge 221 of the cooling fins 220 at an angle towards the core 210. The channel wall 242 may form a contour around the core 210 to form narrow flow path around the core 210. In some embodiments, the channel walls 242 may be a substantially linear wall proximate to the front edge 221 of the cooling fins 220 and a curved wall proximate to the rear edge 222 of the cooling fins 220. The curved surfaces of the channel walls 242 may be contoured to a surface of the core 210, as shown in FIG. 2B. In at least one embodiment, at least a portion of the channel walls 242 has a radius of curvature that is substantially the same as a radius of curvature of the core 210.

Each channel wall 242 is positioned to direct air flow towards surfaces of the core 210 and areas on the cooling fins 220 that would otherwise receive insufficient air flow. In one embodiment, one or more of the channel walls 242 is positioned at angles 250, 251 relative to the front edge 221 of the cooling fins 220. In one embodiment, the angles 250, 251 may be between about 60 degrees to about 80 degrees to the front edge 221 of the cooling fins 220.

As shown in FIG. 2B, the channel walls 242 may converge towards the core 210 near the rear edge 222 of the cooling fins 220. In one embodiment, an air restriction 244 may be formed between the two channel walls 242 facing the rear edge 222 of the cooling fins 220. Air enters the flow channel 240 from the front edge 221 exits through the air restriction 244.

The general direction of air flow within the flow channel 240 is shown by the arrows in FIG. 2B. Consequently, hot spots on the cooling fins 220 and/or on various magnetron 200 components may be reduced. Because the channel walls 242 converge towards the core 210 and/or air restriction 244, the velocity of air flow through the flow channel 240 may be increased near the core 210, particularly near the portion of the core 210 facing the rear edge 222, thus improving cooling efficiency around the core 210.

In one embodiment, the channel walls 242 may be formed using three dimensional printing. In one embodiment, the channel walls 242 may be printed together with the plurality of cooling fins 220 by a three dimensional printer. In another embodiment, the channel walls 242 may be printed with the plurality of cooling fins 220 and the core 210 using three dimensional printing. Alternatively, the channel walls 242 may be manufactured by traditional manufacturing methods.

In FIG. 2A, each channel wall 242 is shown as intersecting the cooling fins 220 along a plane that is substantially perpendicular to the x-y plane in which the cooling fins 220 extend. However, in other examples, the cooling fins 220 may be oriented at other angles (e.g., acute angles and/or obtuse angles) with respect to the cooling fins 220.

Additionally, although only two channel walls 242 are shown in FIGS. 2A and 2B, any number of channel walls 242 may be used to direct air flow towards and/or away from various components within the magnetron 200.

Even though, in the embodiments of FIGS. 2A and 2B, the flow channels 240 between the plurality of cooling fins 220 are identical, patterns of flow channel may be various between different pairs of cooling fins 220 to achieve desired cooling effect. FIGS. 2C-2F illustrate various configurations of channels may be formed that may be disposed between the cooling fins 220 shown in FIG. 2A in accordance to embodiments of the present disclosure.

In FIG. 2C, a cooling channel configuration 240c is formed between the cooling fins 220. In FIG. 2C, each channel wall 242 may include two substantially linear portions 243-1, 243-2 (collective linear portions 243). In one embodiment, the linear portion 243-1 is longer than the liner portion 243-2. The linear portion 243-1 is disposed near the front edge 221 of the cooling fins 220, and the linear portion 243-2 is disposed near the rear edge 222 of the cooling fins 220. Air restrictions 248 may be formed between the core 210 and the channel walls 242.

In the embodiment of FIG. 2C, one or more core cooling fins 246 may be thermally coupled to the core 210 itself. The core cooling fins 246 may be perpendicular to the cooling fins 220. In one embodiment, the core cooling fins 246 may be disposed in the x-y plane and the core 210 may be disposed along the z-axis. In one embodiment, the core cooling fins 246 may be evenly distributed along the circumference of the core 210. Alternatively, the core cooling fins 246 may be arranged in other configuration to achieve desired cooling effects.

In one embodiment, the core cooling fins 246 may be coupled to the core 210 by traditional methods, such as welding. In another embodiment, the core cooling fins 246 and the core 210 may be in a monolithic body. In one embodiment, the core 210 and the core cooling fins 246 may be formed monolithically using a three dimensional printer.

In FIG. 2D, a cooling channel configuration 240d is formed. The cooling channel configuration 240d is substantially similar to the cooling channel 240 of FIG. 2B except that two tail channel walls 250 are formed towards the rear edge 222 on opposite sides of the air restriction 244. In one embodiment, the tail channel walls 250 may be disposed at an angle relative to the rear edge 222 so that the flow channel 240 expands from the air restriction 244 to the rear edge 222. In one embodiment, the tail channel walls 250 may be formed by three dimensional printing.

In FIG. 2E, a cooling channel configuration 240e is formed. The cooling channel configuration 240e is substantially similar to the cooling channel configuration 240c of FIG. 2C except that two head channel walls 252 are formed near the front edge 221 between the channel walls 242. The head channel walls 252 enable side flow paths 240-1 and 240-2. In one embodiment, the head channel walls 252 may be formed by three dimensional printing.

In FIG. 2F, a cooling channel configuration 240f is formed. In FIG. 2F, two pairs of head channel walls 254 are formed near the front edge 221 of the cooling fins 220. Two pairs of tail channel walls 256 are formed near the rear edge 222 of the cooling fins 220. Multiple sub-flow paths 240-1, 240-2, 240-3, 240-4, 240-5 are formed in the cooling channel configuration 240f.

In general, any number and location of channel walls 242 may be used in various examples to control the direction and/or velocity of air flow over the cooling fins 220 and/or other magnetron 200 components.

Figure 3:
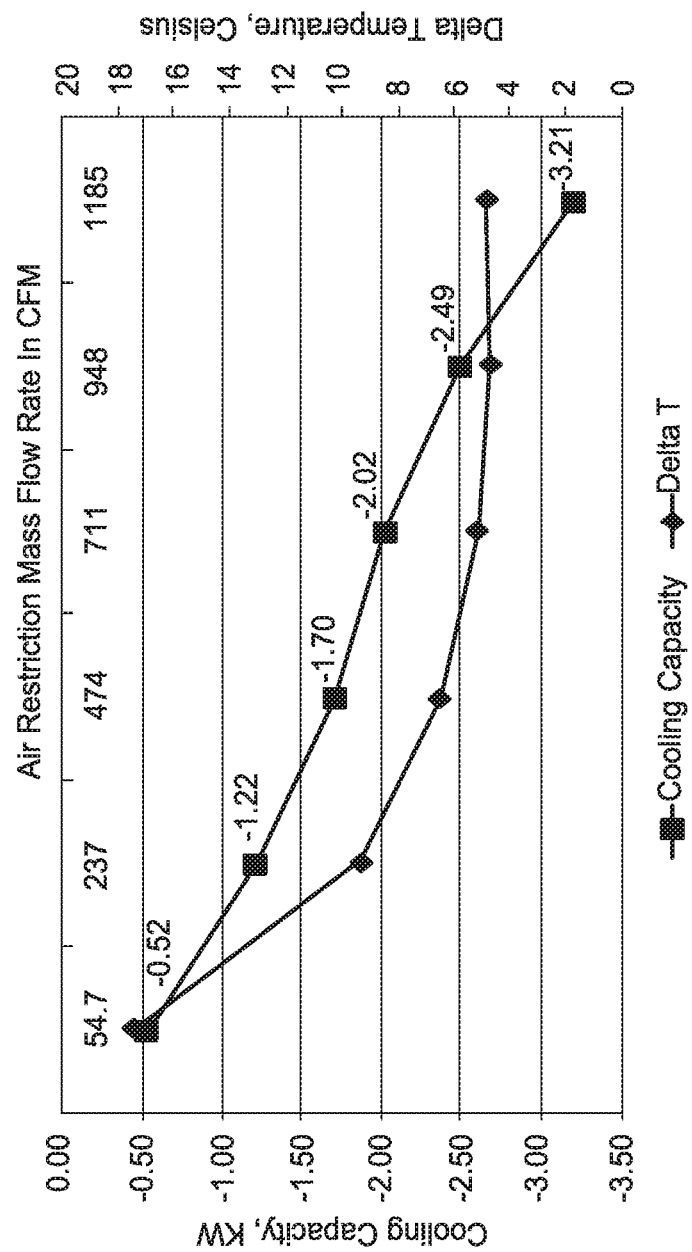
FIG. 3 illustrates the cooling capacity and change in temperature of the cooling fins of FIGS. 2A and 2B as a function of air inlet mass flow rate.

FIG. 3 illustrates the cooling capacity and change in temperature of the cooling fins 220 of FIGS. 2A and 2B as a function of mass flow rate in air restriction 244 according with examples of the disclosure. Increasing the mass flow rate through the air restriction 244 by disposing one or more channel walls 242 between the cooling fins 220 improves the cooling capacity of the cooling fins 220 and reduces the temperature of the cooling fins 220 and nearby magnetron 200 components, such as the core 210. For example, increasing the mass flow rate from about 50 cubic feet/minute (CFM) to about 1000 CFM results in a cooling capacity increase of about 2 kW and a temperature reduction of about 12° C. Thus, in addition to enabling air flow to be directed at specific components within the magnetron 200, the flow directing structure 240 enables the mass flow rate to be increased over certain surfaces of the cooling fins 220 and/or other magnetron 200 components, further enhancing cooling efficiency.

Figure 4A:
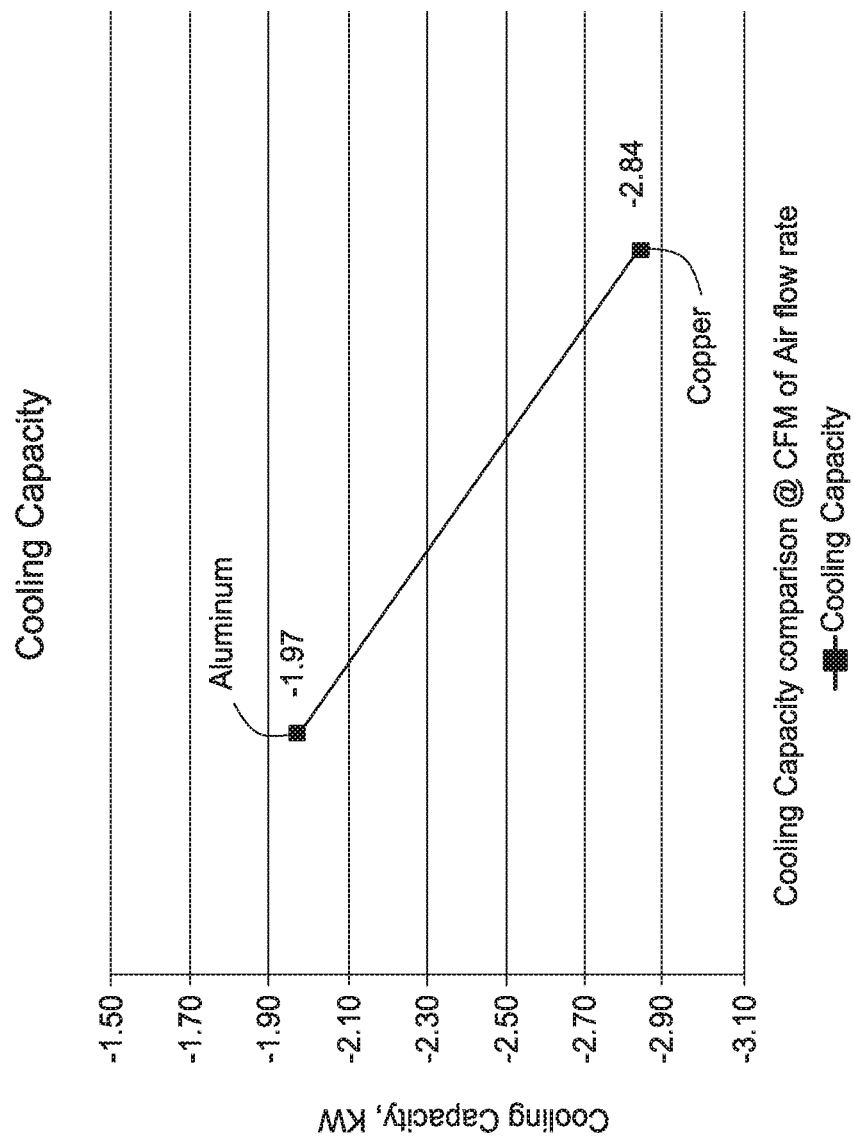
FIGS. 4A and 4B illustrate the temperature distribution over the surface of the cooling fins of FIGS. 2A-2F as a function of cooling fin thickness.
Figure 4B:
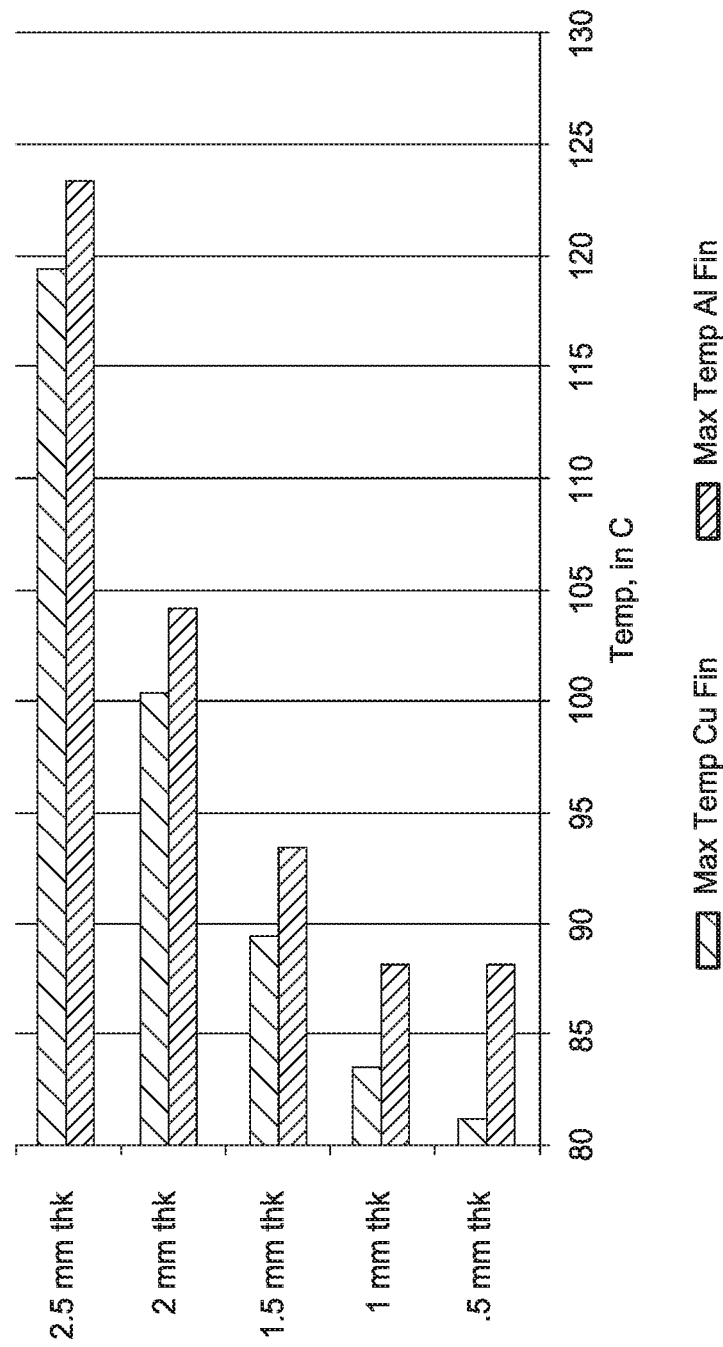

FIG. 4A is a line chart showing cooling capacity of cooling fins made with aluminum and copper respectively. FIG. 4B is bar chart showing maximal temperature over the surface of the cooling fins of FIGS. 2A-2F as a function of cooling fin thickness for aluminum fins and copper fins respectively. Each of the temperature measurements shown in FIG. 4B were taken at a core 210 power of about 3000 watts and an air restriction 244 mass flow rate of about 237 CFM. Reducing the thickness of the cooling fins 220 increases the spacing between the cooling fins 220, thus permitting more air to flow between the cooling fins 220 without reducing the number of cooling fins per unit area. For comparison, conventional cooling fins 120 typically have a thickness of about 2 millimeters or greater. By contrast, in various examples, the cooling fins 220 shown in FIGS. 2A-2F may have a thickness of about 0.5 millimeters to about 1 millimeter, such as about 0.5 millimeters to about 0.7 millimeters.

Reducing the thickness of the cooling fins 220 to the sizes described above allows the spacing between the cooling fins 220 to be increased while still maintaining sufficient thermal capacity to enable each cooling fin 220 to transfer heat away from components of the magnetron 200. That is, at the thicknesses described above, the volume of each cooling fin 220 is sufficient to effectively transfer heat across the surface of the cooling fins 220, allowing heat to be more efficiently removed from the magnetron 200. For example, as shown in FIG. 4B, the maximum temperature of copper cooling fins 220 having a thickness of about 2.5 millimeters is about 119° C., while the maximum temperature of cooling fins 220 having a thickness of 0.5 millimeters is about 82° C. However, at thicknesses of less than about 0.5 millimeters, the volume of each cooling fin 220 is insufficient to effectively transfer heat away from the core 110, causing the maximum temperature of the cooling fins 220 to increase.

Figure 5A:
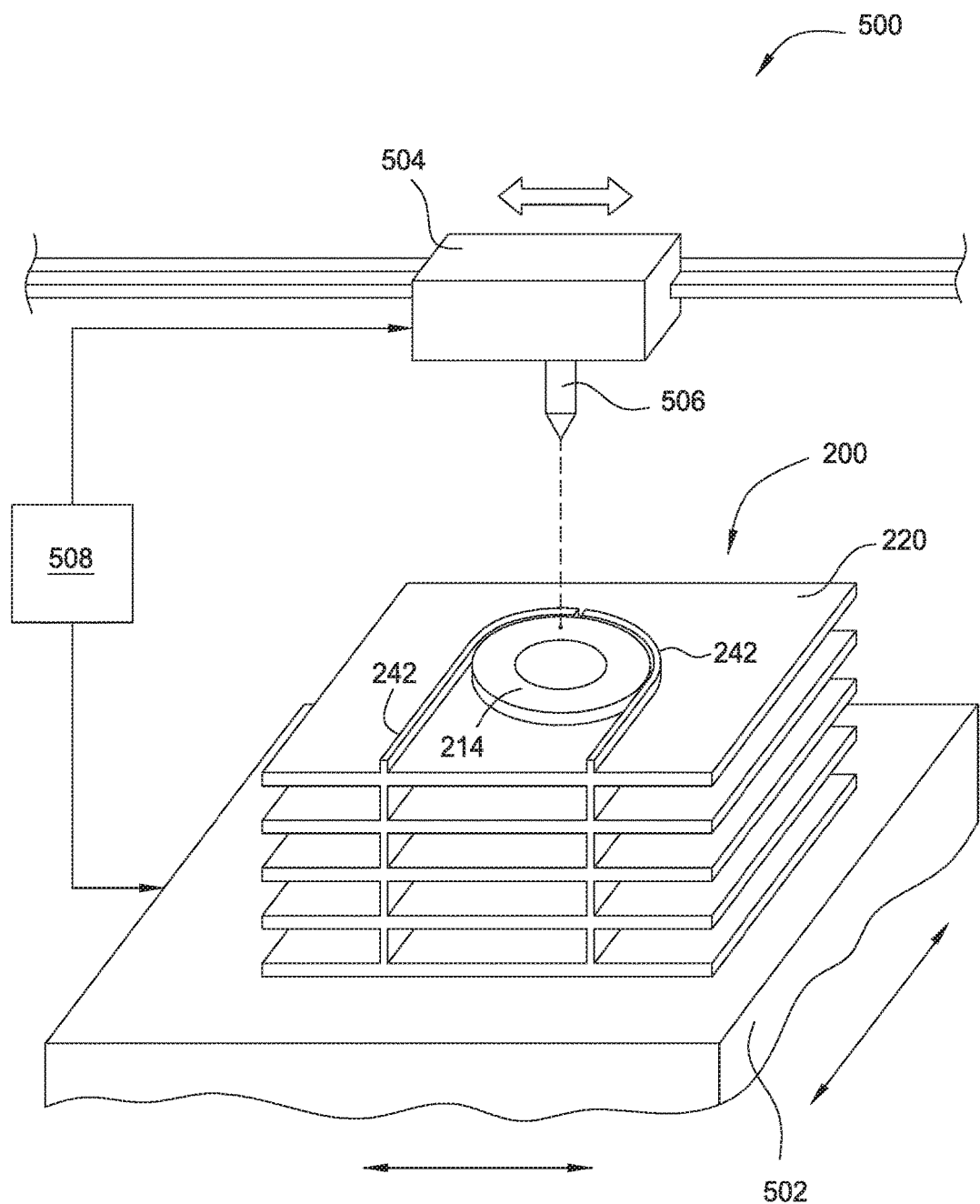
FIG. 5A is a schematic view of forming a magnetron using a three dimensional printer.

FIG. 5A is a schematic view of a 3D printing station 500 for forming a magnetron 200 using a three dimensional printer. In one embodiment, the magnetron 200 may be formed by direct metal laser sintering (DMLS) process, also known as metal 3D printing or 3D metal printing. During a DMLS process, a layer of metal powder is spread across a building platform, and a laser beam to melt 20-40 micron layers of metal powder on top of each other to create metal parts.

The 3D printing station 500 may include a platform 502 and a printer head 504. The print head 504 and the platform 502 may move relative to each other during the printing process. The printer head 504 may include one or more laser source 506. The magnetron 200 may be printed on the platform 502 by moving the print head 504 and directing laser energy from the laser source 506 to selected locations on layers of metal powders through a CAD (computer-aided design) program in a controller 508.

Figure 5B:
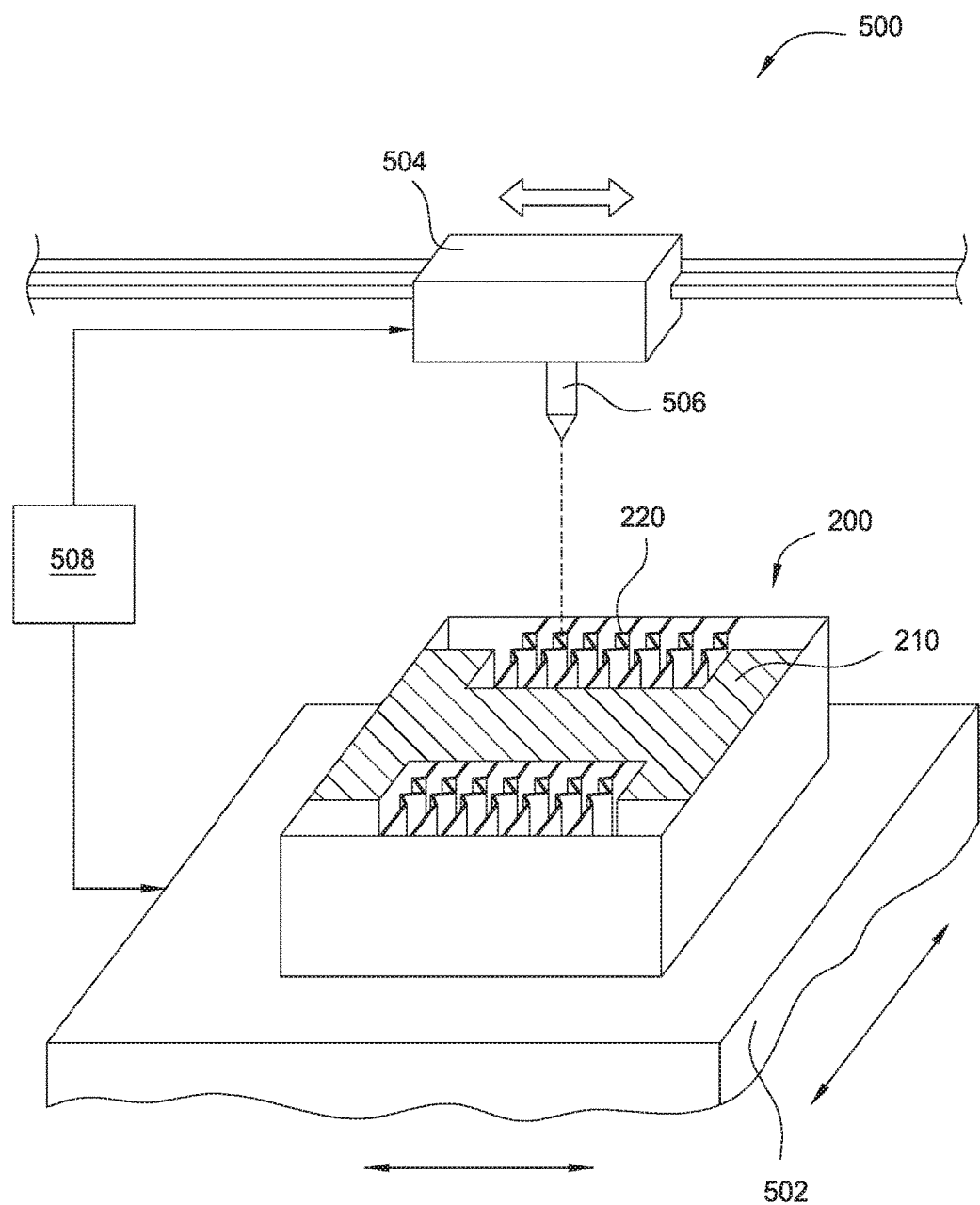
FIG. 5B is a schematic view of forming a magnetron using a three dimensional printer.

FIG. 5B is a schematic view of the 3D printing station 500 forming the magnetron 200 along a different orientation. Magnetrons according to the present disclosure may be "printed" in along any suitable orientations. The printing orientation may be selected to achieve desired properties, obtain printing efficiency, or other considerations.

In one embodiment, magnetrons according to the present disclosure, such as magnetrons of FIGS. 2A-2F, may be printed using powders of thermally conductive metals, such as copper, aluminum, steel, or alloys thereof. Alternatively, magnetrons of the present disclosure may be formed from any suitable material. In one embodiment, cooling fins, flow directing structures, and the core of the magnetron may be formed in monolithically using 3D printing. In another embodiment, cooling fins and flow directing structures may be formed using 3D printing. A core may be coupled to the 3D printed cooling fins by traditional joining methods, such as welding.

While the foregoing is directed to examples of the present invention, other and further examples of the invention may be devised without departing from the basic scope thereof, and the scope thereof is determined by the claims that follow.

We claim:

1. A cooling assembly, comprising:
   a plurality of cooling fins, each cooling fin having a central opening; and
   one or more flow directing structures formed between neighboring cooling fins, wherein the one or more flow directing structures form a flow channel between the neighboring cooling fins, wherein each flow directing structure intersects two or more cooling fins, wherein the one or more flow directing structures comprise channel walls that converge towards and wrap around the central opening, wherein the channel walls are separated from the central opening, and wherein the channel walls extend from a front edge of the cooling fin to an air restriction facing a rear edge of the cooling fin.

2. The cooling assembly of claim 1, wherein the channel walls form a substantially flat surface proximate to the front edge of the cooling fins and form a curved surface proximate to the rear edge of the cooling fins.

3. The cooling assembly of claim 1, wherein the channel walls define the flow channel that expands in a cone-shape from the air restriction adjacent the rear edge to the front edge.

4. The cooling assembly of claim 1, wherein the channel walls are substantially perpendicular to the cooling fins.

5. The cooling assembly of claim 1, wherein the plurality of cooling fins and the flow directing structures are formed as a monolithic body.

6. A magnetron, comprising:
   a core;
   a plurality of cooling fins surrounding the core, each cooling fin having a central opening; and
   one or more flow directing structures formed between neighboring cooling fins, wherein the one or more flow directing structures form a flow channel between the neighboring cooling fins, wherein each flow directing structure intersects two or more cooling fins, wherein the one or more flow directing structures comprise channel walls that converge towards and wrap around the core, wherein the channel walls are separated from the central opening, and wherein the channel walls extend from a front edge of the cooling fin to an air restriction facing a rear edge of the cooling fin.

7. The magnetron of claim 6, wherein the channel walls form a substantially flat surface proximate to the front edge of the cooling fins and form a curved surface proximate to the rear edge of the cooling fins.

8. The magnetron of claim 6, wherein the channel walls define the flow channel that expands in a cone-shape from the air restriction adjacent the rear edge to the front edge.

9. The magnetron of claim 6, wherein the channel walls are substantially perpendicular to the cooling fins.

10. The magnetron of claim 6, wherein the cooling fins and the one or more flow directing structure are formed from at least one of copper, aluminum, or combinations thereof.

11. The magnetron of claim 6, wherein the core, the cooling fins, and the one or more flow directing structures are formed as a monolithic body.

12. The magnetron of claim 6, wherein the plurality of cooling fins are parallel to each other.

13. The magnetron of claim 6, wherein a thickness of at least one cooling fin included in the plurality of cooling fins is about 0.5 millimeters to about 1 millimeter.

14. The magnetron of claim 6, further comprising a plurality of core cooling fins coupled to the core and between neighboring cooling fins.

15. The magnetron of claim 6, wherein the one or more flow directing structure further comprises: two or more head channel walls disposed near a front edge of the cooling fin and in between the channel walls.

16. A method for forming a magnetron, comprising:
additively forming a monolithic body comprising a core and a plurality of cooling fins attached to the core, each cooling fin having a central opening; and
forming one or more flow directing features connected between the two or more cooling fins, wherein each flow directing structure intersects two or more cooling fins, wherein the one or more flow directing structures comprise channel walls that converge toward and wrap around the core, wherein the channel walls are separated from the central opening, and wherein the channel walls extend from a front edge of the cooling fin to an air restriction facing a rear edge of the cooling fin.

17. The method of claim 16, wherein the channel walls form a substantially flat surface proximate to the front edge of the cooling fins and form a curved surface proximate to the rear edge of the cooling fins.

18. The method of claim 16, wherein the one or more flow directing structures form a flow channel between the neighboring cooling fins.

19. The method of claim 18, wherein the channel walls define the flow channel that expands in a cone-shape from the air restriction adjacent the rear edge to the front edge.

20. The method of claim 16, wherein the monolithic body is formed from at least one of copper, aluminum, or combinations thereof.

* * * * *